United States Patent [19]

Okafuji et al.

[11] Patent Number: 5,379,164
[45] Date of Patent: Jan. 3, 1995

[54] HELICAL SCAN SYSTEM INFORMATION SIGNAL RECORDING/REPRODUCING APPARATUS USING CONTROL SIGNAL PHASE DATA AND HEAD HEIGHT DATA FROM MEMORY DURING CONTROL SIGNAL DROP OUT

[75] Inventors: Takayuki Okafuji; Norio Tanaka, both of Kanagawa, Japan

[73] Assignee: Sony Corporation, Tokyo, Japan

[21] Appl. No.: 35,074

[22] Filed: Mar. 22, 1993

[30] Foreign Application Priority Data

Mar. 23, 1992 [JP] Japan .................................. 4-094868

[51] Int. Cl.6 .............................................. G11B 21/04
[52] U.S. Cl. .................................. 360/70; 360/73.13; 360/77.16
[58] Field of Search ................ 360/77.16, 77.13, 73.09, 360/73.12, 73.13, 70, 73.11

[56] References Cited

U.S. PATENT DOCUMENTS

| | | | |
|---|---|---|---|
| 5,126,894 | 6/1992 | Kawaski ...................... | 360/77.13 X |
| 5,247,404 | 9/1993 | Takeda ........................ | 360/77.16 |
| 5,270,884 | 12/1993 | Kim ............................ | 360/73.12 |

FOREIGN PATENT DOCUMENTS

| | | |
|---|---|---|
| 0104023 | 3/1984 | European Pat. Off. . |
| 4020948 | 1/1991 | Germany . |

OTHER PUBLICATIONS

Symposium Record, Broadcast Sessions 13, Jun. 1991, p. 1 and 62-74, D.M. Huckfield & Al. 'A New generation 4:2:2 SVTR'.

*Primary Examiner*—Aristotelis Psitos
*Assistant Examiner*—James L. Habermehl
*Attorney, Agent, or Firm*—William S. Frommer; Alvin Sinderbrand

[57] ABSTRACT

A helical scanning type recording/reproducing apparatus provided with a dynamic tracking head which is moved in a direction perpendicular to a recording track on a magnetic tape and which is controlled by a movement controlling unit to trace the recording track accurately. The recording/reproducing apparatus includes a control phase data memory 10 for storing tape feed phase data, a head height data memory 6 for storing head height data during tracing by the dynamic tracking head and a control signal detection circuit 4 for detecting whether or not the control signals are being reproduced. When the control signals are not being reproduced, the head height position is controlled to be a predetermined head height position, based on data stored in the control phase data memory 10, at the same time that tracking control is performed based on the data stored in the head height memory 6 and the data corresponding to the current head height position.

4 Claims, 3 Drawing Sheets

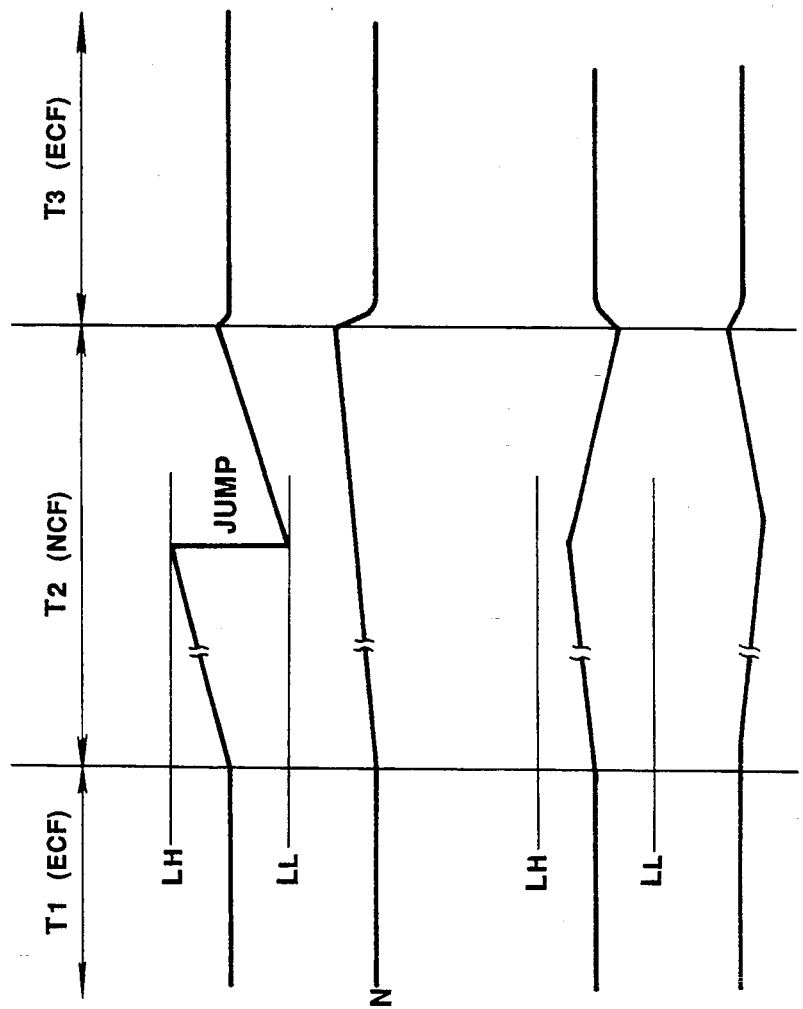

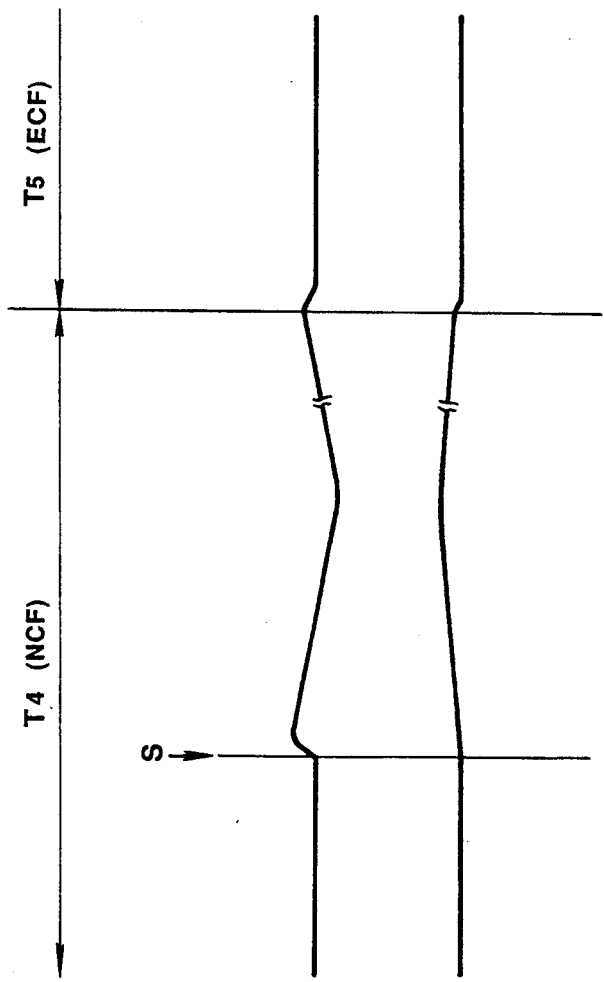

HELICAL SCAN SYSTEM INFORMATION SIGNAL RECORDING/REPRODUCING APPARATUS USING CONTROL SIGNAL PHASE DATA AND HEAD HEIGHT DATA FROM MEMORY DURING CONTROL SIGNAL DROP OUT

BACKGROUND OF THE INVENTION

1. Field of the Invention

This invention relates to a recording and/or reproducing apparatus for recording/reproducing information signals on or from a magnetic tape according to a so-called helical scan system. More particularly, it relates to such recording/reproducing apparatus provided with a dynamic tracking head which is moved in a direction perpendicular to the recording track on the magnetic tape and which is controlled in movement so as to accurately trace a recording track by a movement controlling unit.

2. Description of the Related Art

In a helical scanning type VTR, control CTL signals are recorded on longitudinally extending recording tracks on the magnetic tape, and a phase servo is applied by way of tracking servo, based on the time difference between the playback CTL signals produced on tape reproduction and the reference signals.

Since the CTL signals are reference signals for capstan servo, a capstan motor cannot be phase-locked if the CTL signals cannot be reproduced during the reproduction (play) mode.

Meanwhile, depending on the environment in which a VTR is employed, it frequently occurs that a recording head for recording CTL signals on a magnetic tape, or a playback head for reproducing CTL signals from the magnetic tape, undergoes so-called clogging, in which case the image or sound recorded on the magnetic tape becomes unable to be reproduced. It is however desirable in such case that the sound or image can be reproduced as normally.

With a so-called 1-inch VTR, a capstan motor can naturally not be phase-locked if a magnetic tape free of CTL signals is reproduced. However, with such 1-inch VTR, since audio signals are recorded in the longitudinal direction of the tape, the sound may be reproduced, even although the sound pitch is changed on the order of e.g. 0.1%.

On the other hand, it is possible with the 1-inch VTR to reproduce video signals recorded in the helical direction of the tape with a dynamic tracking head (DT head) which is controlled to be moved in a direction at right angles to the recording tracks on the tape by a movement controlling unit so that, even if the magnetic tape is devoid of the CTL signals, the recording tracks can be traced correctly on rotation of the recording track. However, since the DT head is deflected within a limited extent, head jump is produced if the amount of deflection of the DT head reaches the limit point. If such head jump is produced, it may occur that a one-frame picture may be dropped, or plural frames of pictures be reproduced in a superimposed manner.

Since the CTL signals are employed in the conventional digital VTR for controlling the DT head, reproduction could be made satisfactorily despite dropout of CTL signals for picture dropout on the order of a 1-frame color picture. However, reproduction becomes impossible if the CTL signals are absent for a prolonged time period.

As for the digital audio signals, these signals are recorded in the helical direction, so that sound skipping may be inhibited by cross-fading on the occasion of DT head jumping. However. with the video signals, picture dropout OF Superposition occur unavoidably due to head jump.

OBJECT AND SUMMARY OF THE INVENTION

In view of the above-described status of the aft, it is an object of the present invention to provide a recording/reproducing apparatus in which it is possible to inhibit head jump to inhibit picture dropout, superposition or sound skipping to render reproduction possible even on the occasion of dropout of the CTL signals for an extended period of time.

The present invention provides a recording/reproducing apparatus for information signals in which a DT head mounted on a rotary drum is used for tracing recording tracks on the magnetic tape. The apparatus includes a phase data memory for storing tape feed phase data which is a reference of tape feed phase, a head height data memory for storing head height data which is a reference for the head height during tracing of the recording track by the DT head and a control signal detection circuit for detecting whether or not control signals as the tape feed phase reference are being reproduced from the tape. If the control signal detection circuit detects that the control signals are not being reproduced from the tape, the head height position of the dynamic head is controlled to a predetermined value based on the tape feed phase data stored on the phase data memory, while tracking control is performed based on the head height data stored on the height data memory and the current head height position.

The present invention provides a recording/reproducing apparatus for information signals in which a DT head mounted on a rotary drum is used for tracing recording tracks on the magnetic tape which comprises a control signal detection circuit for detecting whether or not control signals as the tape feed phase reference are being reproduced from the tape, a control signal phase detection circuit for detecting the phase of control signals reproduced from the tape, a phase data memory for holding the reference tape feed phase data as an initial value and for storing control signal phase data from the control signal phase detection circuit, a head height position controlling means for controlling the height position of the DT head for maximizing the envelope of the playback RF signals from the recording tracks, a head height data generating circuit for generating head height data of the DT head from the output of the head height position controlling circuit and the output of the control signal phase detection circuit or the output of the phase data memory, a control signal phase comparator for comparing the phase of the control signals reproduced from the tape and that of reference control signals, a head height data memory for holding the reference head height data as an initial value and for storing head height data from the head height data generating means as an initial value, a height data comparator for comparing the output of the height data memory and that of the head height data generating circuit, a tape running speed detection circuit for detecting the tape running speed, and a tape running driving data generating means for generating the tape running driving data supplied to a tape running driving unit from the output of the control signal phase comparator or the output of the height data comparator and the output of the tape running speed detection circuit.

That is, if, in the present recording/reproducing apparatus, the control signal detection circuit finds that the control signals are being reproduced from the tape, the tape running driving data is generated in the tape running driving data generating circuit based on the output of the control signal phase comparator and that of the tape running speed detection circuit, while the head height data are generated in the head height data generator based on the output of the control signal phase detection circuit and that of the head height position controlling circuit.

Conversely, if the control signal detection circuit finds that the control signals are not being reproduced from the tape, the tape running driving data is generated in the tape running driving data generating circuit based on the output of the height data comparator and that of the tape running speed detection circuit, while the head height data are generated in the head height data generator based on the output of the phase data memory and that of the head height position controlling circuit.

That is, with the present recording/reproducing apparatus, if the control signal detection circuit finds that no control signals are being generated, the tape running speed and the head height position are controlled using the head height data stored in the head height data memory and the tape feed phase data stored in the phase data memory.

Other objects and advantages of the present invention will become apparent from the following description of the preferred embodiments and the claims.

BRIEF DESCRIPTION OF THE DRAWINGS

FIGS. 2A, 2B and 2C, 2D are diagrams to which reference will be made in explaining changes of head height and rotational speed of a capstan motor for a conventional recording/reproducing apparatus and for the recording/reproducing apparatus of FIG. 1, respectively, which are produced by CTL signals failing to be reproduced during signal reproduction; and FIGS. 3A and 3B on diagrams to which reference will be made in explaining changes of the head height and the rotational speed of the capstan motor for the recording/reproducing apparatus of FIG. 1, which are produced by CTL signals failing to be reproduced at the starting time of signal reproduction.

DETAILED DESCRIPTION OF THE PREFERRED EMBODIMENT

Figure 1:
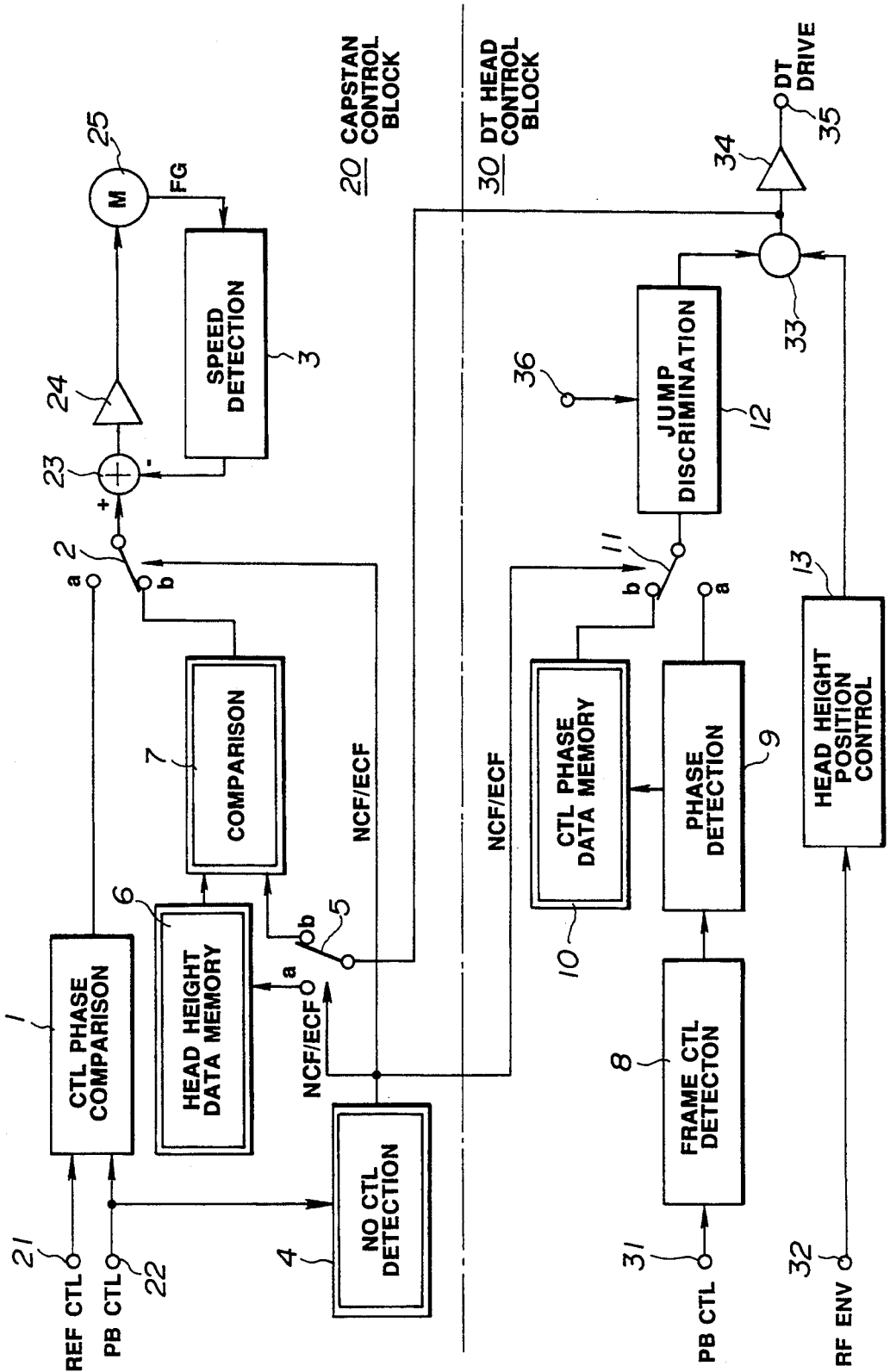
FIG. 1 is a block circuit diagram showing a schematic arrangement of the recording/reproducing apparatus for information signals according to the present invention.

The recording/reproducing apparatus for information signals according to the present invention is adapted for tracing recording tracks on a magnetic tape by a dynamic tracking head (DT head) mounted on a rotary drum, not shown, and is made up of a CTL phase data memory 10, as a phase data storage means for storing feed phase data as tape feed phase reference data, a head height data memory 6 as head height data storage means for storing head height data used as a head height reference data during tracing of the recording tracks by the DT head, and a CTL signal detection circuit 4 for detecting if a control signal (CTL signal) as a tape feed phase reference data is being reproduced from the tape, as shown in FIG. 1. If the CTL signal detection circuit 4 finds that the CTL signal is not being reproduced from the tape, the height position of the DT head is controlled to a predetermined height based on the tape feed phase data stored in the CTL phase data memory 10, while tracking control is performed based on the height data stored in tile head height data memory 6 and data corresponding to the current head height.

The present recording/reproducing apparatus includes a DT head controlling block 30, which in turn includes a CTL phase detection circuit 9 (control signal phase detection unit) adapted for detecting the phase of CTL signals reproduced from the tape and outputting the CTL phase data, and the aforementioned CTL phase data memory 10 adapted for storing the reference tape feed data as the tape feed phase reference data, such as the reference CTL phase data, as an initial value, storing the CTL phase data from the CTL phase detection circuit 9 when the CTL signal detection circuit 4 detects that the CTL signals are being reproduced from the tape, and outputting the reference tape feed data held as the initial value or the previously stored CTL phase data from the CTL phase detection circuit 9, when the circuit 4 detects that the CTL signals are not being reproduced from the tape. The controlling block 30 also includes a head height position control circuit 13 adapted for generating control signals for controlling the DT head height position for maximizing an envelope of reproduced RF signals from the recording track, and an additive node 33, as head height data forming means, adapted for forming the head height data of the DT head from an output of the head height position control circuit 13 and an output of the CTL phase detection circuit 9 or an output of the CTL phase data memory 10.

The present recording/reproducing apparatus also includes a capstan controlling block 20, which in turn includes the aforementioned CTL signal detection circuit 4, a CTL phase comparator 1 (control signal phase comparator) for comparing the phase of the CTL signals reproduced from the tape with the phase of the reference CTL signals, and the aforementioned head height data memory 6 adapted for holding, as an initial value, the reference head height data used as head height reference data when the DT head is tracing a track center (home track) of a recording track, storing the head height data from the additive node 33 when the CTL signal detection circuit 4 detects that the CTL signals are being reproduced from the tape, and outputting the reference head height data held as the initial value or the previously stored head height data from the additive node 33 when the CTL signal detection circuit 4 detects that the CTL signals are not being reproduced from the tape. The controlling block 20 also includes a height data comparator 7 adapted for comparing an output of the head height data memory 6 with that of the additive node 33, a tape speed detection circuit 3 adapted for detecting the tape running speed for outputting control signals for controlling the rotational speed of a capstan motor 25, and a second additive node 23, as tape running and driving data forming means, adapted for forming from an output of the CTL phase comparator 1 or an output of height data comparator 7 and an output of the tape speed detection circuit 3, tape running and driving data to be supplied to the capstan motor 25 as tape running and driving means.

That is, in the present recording/reproducing apparatus, if the CTL signal detect;ion circuit 4 detects that the CTL signals are being reproduced from the tape, the additive node 23 adds the output of the CTL phase comparator 1 so that of the tape speed detection circuit, 3 to generate the tape running driving data, while the additive node 33 adds the output of the CTL phase detection circuit, 9 to that of the head height, position control circuit 13 to generate the head height, data.

On the other hand, if the CTL signal detection circuit 4 detect that the CTL signals are not being reproduced from the tape, the additive node 23 adds the output of the height data comparator 7 to that of the tape speed detection circuit 3 to generate the tape running driving data, while the additive node 33 adds the output of the CTL phase data memory 10 to that of the head height position control circuit 13 to generate the head height data.

In the present recording/reproducing apparatus, shown in FIG. 1, reference CTL signals are supplied to a terminal 21 of the capstan control block 20, while playback CTL signals reproduced from the tape are supplied to a terminal 22, if such CTL signals are pre-recorded on the tape.

The above-mentioned CTL signals are supplied to a terminal 31 of the DT head control block 30, while envelope signals of playback RF signals, reproduced from the recording track of the tape, are supplied to a terminal 32.

It is first assumed that the CTL signals are recorded on the tape and playback CTL signals are supplied to terminals 22, 31. In such case, CTL signal detection circuit 4 detects that the CTL signals are being reproduced from the tape as playback CTL signals and outputs a signal of that effect in the form of a flag ECF indicating the presence of the playback CTL signal. If CTL signal detection circuit 4 detects that the CTL signals are not being reproduced from the tape, that is if the CTL signals are not pre-recorded on the tape or if the CTL signals are pre-recorded but have not been reproduced, the detection circuit 4 outputs a signal of that effect in the form of a flag NCF indicating the absence of the playback CTL signals.

The playback CTL signals and the reference CTL signals are supplied via terminals 22 and 21 to the CTL phase comparator 1 of the capstan control block 20. The CTL phase comparator 1 compares the phase of the playback CTL signals with that of the reference CTL signals to transmit the results of comparison in the form of, for example, a phase difference, to a fixed terminal a of a switch 2.

The switch 2 has its movable contact shifted to the fixed terminal a or to the fixed terminal b if the flag from the CTL signal detection circuit 4 is the flag ECF indicating the presence of the playback CTL signal or the flag NCF indicating the absence of the playback CTL signal, respectively. Since the flag ECF is supplied in the instant case from the CTL signal detection circuit 4, the movable contact 2 is shifted to the fixed terminal a.

An output signal from the CTL signal phase comparator 1 is supplied via switch 2, which has its movable contact shifted to its fixed terminal A, to the additive node 23 as an addition signal. A detection signal from the tape speed detection circuit 3, detecting the tape running speed based on FG signals concomitant with rotation of the tape during capstan motor 25, is also supplied to the additive node 23 as a subtraction signal. An output of the additive node 23 is to be the aforementioned tape running driving data which is supplied via a motor driving amplifier 24 as motor driving signals for rotationally driving the capstan motor 25 for running and driving the tape.

The playback CTL signals, supplied to terminal 31 of the DT head control block 30, are supplied to a frame CTL signal detection circuit 8 which is designed for detecting the CTL signals from the CTL signals on a frame-by-frame basis. An output of the frame CTL signal detection circuit is transmitted to the CTL phase detection circuit 9 for detecting the phase of the playback CTL signals.

An output of the CTL phase detection circuit 9 is supplied to a movable terminal a of a switch 11. Similarly to switch 2, switch 11 has its movable contact shifted to fixed terminals a and b by the flags ECF and NCF from the CTL signal detection circuit 4, respectively. Since the flag ECF is supplied in the instant case from the CTL signal detection circuit 4, the switch 11 has its movable contact shifted to the fixed terminal a.

The output signals of the CTL phase detection circuit 9 is transmitted via switch 11, which has its movable contact shifted to the fixed terminal a, to a jump discriminating circuit 12 adapted for discriminating, based on the tape speed data supplied thereto via terminal 36, to which of recording tracks in the vicinity of the recording track which has just been scanned and reproduced the head is to jump. The output signals of the CTL phase detection circuit 9 are transmitted via jump discriminating circuit 12 to the additive node 33 as an addition signal.

Output signals of the head height position control circuit 13, adapted for controlling the height position of the DT head for maximizing the envelope of the playback RF signals based on envelope signals from terminal 32, are also supplied as addition signals to the additive node 33. An output of the additive node 33, which is the above-mentioned head height data, is transmitted via DT head driving amplifier 34 so as to be turned into DT head driving signals for driving the DT head in a controlled manner.

Meanwhile, in a recording/reproducing apparatus in general, if CTL signals fail to be reproduced from the tape due to e.g. clogging of the playback head so that the CTL signals fail to be supplied to terminals 22, 31, or if some portions of the tape are destitute of the CTL signals due to e.g. clogging of the CTL recording head, tracking cannot be made in a regular manner. If, in an attempt to maintain regular tracking, the rotation of the capstan motor 25 is controlled so as to be equal to the tape speed which prevailed directly before dropout of the playback CTL signals, phase shifting is gradually incurred from the reference phase. The usual measure to be taken in such case is to control the height of the DT head in an amount corresponding to the phase shift for causing the DT head to trace the entire track correctly. However, since there is a limitation to the extent of possible deviation of the height position of the DT head, it becomes necessary to perform head jump.

In the instant recording/reproducing apparatus, when the playback CTL signals cease to be supplied as described above, tracking control is achieved in the following manner.

That is, in the present recording/reproducing apparatus, the phase data of the CTL signals, which were detected by the CTL signal detection circuit 9 (CTL phase data) when the circuit 4 detected that the CTL signals were being reproduced from the tape, before the playback CTL signals ceased to be reproduced from the tape, are stored in the CTL phase data memory 10 of the CTL phase detection circuit 9. The head height data outputted from the additive node 33 are also stored at this time in the head height data memory 6 of the capstan control block 20 via a switch 5 which has its movable contact shifted to the fixed terminal a similarly to switches 2, 11.

If the playback CTL signals cease to be supplied to terminals 22, 31, the flag NCF indicating the absence of the CTL signals is outputted by the CTL signal detection circuit 4. This causes the switches 2, 5 and 11 to be set to the sides of the fixed terminals b.

The above-mentioned playback CTL phase data, previously stored in the CTL phase data memory 10, are outputted from CTL phase data memory 10. That is, the CTL phase data of the playback CTL signals stored therein while the CTL signals were reproduced in the regular manner, are outputted from the CTL phase data memory 10. The CTL phase data from the CTL phase data memory 10 is transmitted to the additive node 33 via the switch 11 set to the side of the fixed terminal b and the jump discrimination circuit 12. Consequently, the head height data From the additive node 33 becomes the data indicating a predetermined head height which is based on the CTL phase data stored in the CTL phase data memory 10. In other words, since the head height information from the CTL phase data memory 10 is the data which prevailed when the DT head was tracing the track center of a recording track, the predetermined head height data from the additive node 33 also is the head height data which prevailed when the DT head was tracing the track center. The result is that, if the tape speed is the normal one, it becomes possible for the DT head to scan the recording head correctly.

Besides, since the head height position controlling data which will maximize the envelope of the playback RF signals is supplied at this time from the head height position controlling circuit 13 to the additive node 33, it becomes possible for the DT head to trace the recording track correctly.

On the other hand, the head height position data memory 6 of the capstan control block 20 outputs the previously stored head height data. That is, the head height data memory 6 outputs the head height data which prevailed when the DT head was tracing the track center of the recording track. The head height data from the head height memory 6 is transmitted to the height data comparator 7. The current head height data from the additive node 33 is also supplied to the height data comparator 7 via switch 5 changed over to the side of the fixed terminal b. Thus the height data comparator 7 outputs a result of comparison, such as a difference, between the current head height data and the head height data which prevailed when the head was tracing the track center of the preceding recording track. Consequently, if the difference data is supplied to the additive node 23 via switch 2 changed over to the side of the fixed terminal b, regular tape running and driving data can be produced from additive node 23.

In this manner, it is possible with the present recording/reproducing apparatus to achieve correct tracking control even in cases wherein the CTL signals cease to be reproduced from the tape because of e.g. clogging of the CTL playback head or the playback CTL signals cease to be supplied to terminals 22, 31 because a certain portion(s) of the tape is destitute of pre-recorded CTL signals.

Besides, it is possible with the recording/reproducing apparatus to achieve correct tracking control not only when the CTL signals cease to be reproduced during tape reproduction as mentioned above, but also when the CTL signals are not recorded on the entire tape or on a starting portion of the tape, or when the CTL signals are not available from the playback start position of a tape, inclusive of a position other than the leading end of the tape, as the recording/reproducing apparatus shifts from the playback halt state, inclusive of a power-off state, to the tape reproducing state.

That is, the above-mentioned head height position data memory 6 holds, as the initial value, the head height data, which is to be the reference data for the head height when the DT head is tracing the recording track, as mentioned previously. On the other hand, the CTL phase data memory 10 holds, as the initial value, the reference tape feed phase data which is to be the reference data for tape speed phase. Consequently, with the present embodiment, in case playback CTL signals are not supplied to the terminals 22, 31, as when the CTL signals are not recorded on the tape from the outset or when the playback CTL signals are not available at the starting time of reproduction, correct tracking control may be achieved by employing the reference head height data held as the initial value in the head height data memory 6 and the reference CTL phase data held as the initial value in the CTL phase data memory 10 and by carrying out subsequent operations in the same manner as when the playback CTL signals fail to be supplied in the course of reproduction.

Specifically, if the CTL signals are not recorded on the entire tape or at a beginning part of the tape, or if, when the recording/reproducing apparatus is changed over from the playback halt state, inclusive of the power turn-off state, to the tape reproducing state, the CTL signals are not available from the playback start position of the tape, inclusive of the tape positions other than the leading end position, the flag NCF indicating the lack of the CTL signals is outputted from the CTL signal detection circuit 4. This causes the switches 2, 5 and 11 to be changed over to the sides of the fixed terminals b.

The above-mentioned reference CTL phase data is outputted at this time from CTL phase data memory 10. The reference CTL phase data from the CTL phase data memory 10 is supplied to the additive node 33 via switch 11 and jump discrimination circuit 12. Thus, the head height data from additive node 33 is the data indicating the predetermined head height based on the reference CTL phase data. Since the head height position control data which will maximize the envelope of RF playback signals is supplied at this time to the additive node 33, it becomes possible for the DT head to trace the recording track correctly.

On the other hand, the head height data memory 6 outputs the above-mentioned reference height data. The reference head height data from the head height data memory 6 is supplied to the height data comparator 7 which is also supplied with the current head height data from additive node 33. Thus, the height data comparator 7 outputs the results of comparison between the current head height data and the reference head height data, so that the regular tape running and driving data may be obtained at the additive node 23 supplied with the output of the height data comparator 7.

In this manner, it becomes possible with the present recording/reproducing apparatus to achieve correct tracking control if the CTL signals are not recorded on the entire tape or at a beginning part of the tape, or if, when the recording/reproducing apparatus is changed over from the playback halt slate, inclusive of the power turn-off state, to the tape reproducing state, the CTL signals are not available from the playback start position of the tape, inclusive of the tape positions other than the leading end position.

FIG. 2 shows the state of changes in the head height position and in the rotational speed of the capstan motor 25 in case CTL signals cease to be supplied during tape reproduction with a conventional recording/reproducing apparatus and the present recording/reproducing apparatus. That is, FIGS. 2A and 2B show how the DT head height and the rotational speed of the motor are changed in the conventional recording/reproducing apparatus during the time when the CTL signals are being reproduced from the tape. With the flag ECF being set up, during the time period $T_1$, the CTL signals cease to be reproduced from the tape during the time period $T_2$, with the flag NCF being set up, and when the CTL signals start again to be reproduced during the time period $T_3$, with the flag ECF again set up. FIGS. 2C, 2D show the manner of changes in the DT head height and in the rotational speed of the motor in the present recording/reproducing apparatus, similar to those mentioned above.

FIGS. 2A and 2B, if the CTL signals are being reproduced during the time period $T_1$, with the flag ECF being set up by the CTL signal detection circuit 4 indicating the presence of the playback CTL signals, the head height remains constant and rotating capstan motor 25 has its phase of rotation locked with respect to the reference phase. If the playback CTL signals cease to exist during the time period $T_2$, with the flag NCF being set, the DT head height is gradually deviated until a limit of deviation of the DT head ($L_H$, $L_L$) is reached, at which time a head jump is incurred. With the capstan motor 25 rotating at a constant speed, the rotational phase is shifted gradually. The height and the rotational phase of the DT head are resumed to normal values when the CTL signals start to be reproduced during the time period $T_3$, with the flag ECF again set up.

Conversely, with the present recording/reproducing apparatus, the DT head height is not deviated up to the limit points ($L_H$, $L_L$) even although the CTL signals cease to exist during the time period $T_2$, as shown at C and D in FIGS. 2C and 2D. That is, if the DT head height is increased, the rotational speed of the capstan motor 25 is controlled to be slower, with the DT head height being shifted gradually to a smaller value, whereas, if the DT head height is decreased, the rotational speed of the capstan motor 25 is controlled to be faster, with the DT head height being shifted gradually to a larger value. The result is that the recording tracks may be reproduced without DT head jumps.

FIG. 3 shows how the head height position and the rotational speed of the capstan motor 25 are changed in the present recording/reproducing apparatus if no CTL signals are recorded on the entire tape or at the beginning part of the tape or if the recording/reproducing apparatus is shifted from the reproduction halt state, inclusive of the power turn-off state, to the tape reproducing state, and the CTL signals are not available from the reproduction start position of the tape, inclusive of the power turn-off state. That is, FIG. 3A and 3B shows how the head height and the rotational speed of the motor are changed if reproduction is started at time point S during a time period $T_4$ in the absence of tile playback CTL signals, with the flag ECF being set, and subsequently the playback CTL signals are supplied during the time period $T_5$.

Referring to FIGS. 3A and 3B, when the tape starts to be reproduced at the reproduction start point S, DT head traces the recording tracks as it is controlled so that the envelope of the playback RF signals will be maximum. Since the head height data supplied at this time to the capstan control block 20 differs from the initial value held by the head height data memory 6, the height data comparator 7 outputs a value of the results of comparison which will cause the head height data to coincide with the initial value of the head height data memory 6 as a result of gradual rotation of the capstan motor on the downstream side. In other words, the height data comparator 7 controls the rotation of the capstan motor 25. That is, the capstan motor 25 causes the tape phase to be rotated gradually until the head height data will be equal to the initial value of the head height data memory 6. During such time interval, the DT head traces the recording track based on Control data supplied from the head position controlling circuit 13.

It will be seen from the foregoing that the recording-/reproducing apparatus according to the present invention is free from sound skipping OF from picture superposition or dropout due to elimination of head jumps. Signal playback may be achieved in the absence of the playback CTL signals over an extended period of time or in the absence of CTL signals at the starting point or at the time point of start of reproduction. Besides, the sound pitch is not changed because the playback time becomes accurately equal to the recording time.

What is claimed is:

1. An apparatus for recording/reproducing information signals onto and from a plurality of recording tracks on a magnetic tape having a magnetic head, each of said recording tracks being formed on said magnetic tape at a predetermined slant angle, said apparatus comprising:
means for receiving a reference tape position signal and a reproduced tape position signal, said reproduced tape position signal being reproduced from said magnetic tape and being adapted to indicate position on said magnetic tape;
means for comparing said reproduced tape position signal and said reference tape position signal so as to produce a tape phase error signal;
a motor for driving said magnetic tape;
means for obtaining a rotational speed data signal from said motor;
detection means for detecting if said reproduced tape position signal is reproduced from said magnetic tape and for supplying therefrom a detecting signal which indicates the results of such detection;
head tracking control means for forming a head tracking control signal for controlling deviation of said magnetic head which is adapted to deflect in a direction perpendicular to said recording tracks, said head tracking control means including phase memory means for storing phase data which may be utilized as a phase reference, said head tracking control signal being based on a reproduced level of the reproduced information signals obtained by scanning said recording tracks and one of the phase of said reproduced tape position signal and the stored phase data from said phase memory means in response to said detecting signal, said head tracking control means controlling tracking of said magnetic head relative to one of said recording tracks to be tracked by said head tracking control signal, said reproduced information signals being produced from said recording tracks on said magnetic tape by said magnetic head;

tape running control means for generating a motor driving signal for driving said motor so as to cause said magnetic tape to run at a predetermined speed and to control the phase of the running magnetic tape, said tape running control means including head deflection data memory means for storing head deflection data, said motor driving signal being based on said rotational speed data signal and one of said tape phase error signal and a signal obtained from the stored head deflection data from said head deflection data memory means and said head tracking control signal in response to said detecting signal; and switching control means responsive to said detecting signal so as to cause said head tracking control means to form said head tracking control signal based on said reproduced level of the reproduced information signals and the phase of said reproduced tape position signal and to cause said tape running control means to generate said motor driving signal based on said rotational speed data signal and said tape phase error signal when said detecting signal indicates that said reproduced tape position signal is reproduced, and to cause said head tracking control means to form said head tracking control signal based on said reproduced level of the reproduced information signals and said stored phase data and to cause said tape running control means to generate said motor driving signal based on said rotational speed data signal and said signal obtained from said stored head deflection data and said head tracking control signal when said detecting signal indicates that said reproduced tape position signal fails to be reproduced.

2. The apparatus for recording/reproducing information signals as in claim 1, wherein said head tracking control means includes:

head deflection control signal forming means for forming head deflection control signals for controlling head deflection during scanning of one of said recording tracks by said magnetic head responsive to the reproduction level of said reproduced information signals for maximizing said reproduction level, jump discriminating means for discriminating another one of the recording tracks to be scanned after scanning of said one of said recording tracks, said jump discriminating means being responsive to the running speed of said magnetic tape and one of the phase of said tape position signals and an output of said phase memory means for causing said rotational magnetic head to jump to said another of said recording tracks to be scanned, and first signal summing means for summing an output of said head deflection control signal forming means and an output of said jump discriminating means for forming said head tracking control signal, said tape running control means including:

comparator means for comparing an output of said head deflection data memory means and said head tracking control signal, and second signal summing means for summing said rotational speed data signal and one of said tape phase error signal and an output of said comparator means so as to form said motor driving signals, said switching control means including:

first switching means having a first fixed terminal which receives phase signals indicating the phase of said reproduced tape position signal and a second fixed terminal which receives an output of said phase memory means, said first switching means selecting, in response to said detecting signal, one of the signals received by said first and second fixed terminals and supplying the selected signal to said jump discriminating means, second switching means having a movable contact which receives said head tracking control signal and, in response to said detecting signal, supplies therefrom said head tracking control signal to one of said head deflection data memory means by way of a first fixed terminal and said comparator means by way of a second fixed terminal, and third switching means having a first fixed terminal which receives said tape phase error signal and a second fixed terminal which receives the output of said comparator means. said third switching means selecting, in response to said detecting signal, one of the signals received by said first and second fixed terminals and supplying the selected signal to said second signal summing means, said first, second and third switching means being controlled to select the respective first fixed terminals and the respective second fixed terminals when said detecting signal indicates that said reproduced tape position signal is reproduced and when said detecting signal indicates that said reproduced tape position signal fails to be reproduced, respectively, said phase memory means storing the phase of said reproduced tape position signal prevailing when said detection means detects that said tape position signal is being reproduced, said head deflection data memory means storing said head tracking control signal prevailing when said detection means detects that said tape position signal is being reproduced.

3. The apparatus for recording/reproducing information signals as in claim 2, wherein said phase memory means stores fixed initial phase data, said head deflection data memory means stores fixed initial deflection data, said phase memory means and said head deflection data memory means supplies therefrom the respective initial values on starting the running of said magnetic tape.

4. The apparatus for recording/reproducing information signals as in claim 2, wherein the tape position signals recorded on said magnetic tape means are control signals which are recorded on longitudinally extending tracks of said magnetic tape.

* * * * *